US012500282B2

(12) United States Patent
Tyagi et al.

(10) Patent No.: US 12,500,282 B2
(45) Date of Patent: Dec. 16, 2025

(54) METHOD AND SYSTEM FOR EXTRACTING BLACK MASS FROM SPENT LITHIUM ION BATTERIES

(71) Applicant: AGR LITHIUM INC., Bellevue, WA (US)

(72) Inventors: Vipin Tyagi, Bellevue, WA (US); Amol Naik, Noida (IN); Nishchay Chadha, Singapore (SG)

(73) Assignee: AGR LITHIUM INC., Houston, TX (US)

( * ) Notice: Subject to any disclaimer, the term of this patent is extended or adjusted under 35 U.S.C. 154(b) by 0 days.

(21) Appl. No.: 18/368,895

(22) Filed: Sep. 15, 2023

(65) Prior Publication Data
US 2024/0097227 A1 Mar. 21, 2024

Related U.S. Application Data

(60) Provisional application No. 63/407,265, filed on Sep. 16, 2022.

(51) Int. Cl.
*H01M 10/54* (2006.01)
*C01B 32/205* (2017.01)
(Continued)

(52) U.S. Cl.
CPC ......... *H01M 10/54* (2013.01); *C01B 32/205* (2017.08); *C22B 1/24* (2013.01); *C22B 7/001* (2013.01); *C22B 7/005* (2013.01); *C22B 7/007* (2013.01)

(58) Field of Classification Search
CPC ........ H01M 10/54; C01B 32/205; C22B 1/24; C22B 7/001; C22B 7/005; C22B 7/007; Y02W 30/08
See application file for complete search history.

(56) References Cited

U.S. PATENT DOCUMENTS

2020/0399736 A1\* 12/2020 Joensuu .................. C05D 9/00
2021/0078013 A1    3/2021 Kochhar et al.
(Continued)

FOREIGN PATENT DOCUMENTS

CN     111270073 A    6/2020
CN     112746174 A    5/2021
(Continued)

OTHER PUBLICATIONS

International Search Report issued Sep. 12, 2023 for International Patent Application No. PCT/US23/22232.
(Continued)

*Primary Examiner* — Daniel S Gatewood
(74) *Attorney, Agent, or Firm* — Morgan, Lewis & Bockius LLP

(57) ABSTRACT

A method for obtaining a metal salt from a spent lithium-ion (Li-ion) battery may include contacting a leaching solvent to a portion of the spent lithium-ion battery to form a first dispersion. The first dispersion is heated to a temperature in a range from 50° C. to 90° C. by applying microwave radiation. The temperature of the first dispersion is maintained to be in the range from 50° C. to 90° C. for a period in a range from 10 seconds to 5 minutes by further applying microwave radiation to the heated first dispersion. The first dispersion is filtered to obtain a first filtrate. The first dispersion is then filtered to separate undissolved material from a first filtrate. The undissolved precipitate is dehydrated to obtain the black mass.

15 Claims, 2 Drawing Sheets

(51) Int. Cl.
C22B 1/24 (2006.01)
C22B 7/00 (2006.01)

(56) References Cited

U.S. PATENT DOCUMENTS

| | | |
|---|---|---|
| 2021/0344058 A1 | 11/2021 | Liu et al. |
| 2021/0395859 A1 | 12/2021 | Ding et al. |
| 2022/0009793 A1 | 1/2022 | Fraser et al. |
| 2022/0251681 A1 | 8/2022 | Rohde et al. |

FOREIGN PATENT DOCUMENTS

| | | | |
|---|---|---|---|
| TW | I644468 B | | 12/2018 |
| TW | 201916448 A | * | 4/2019 |

OTHER PUBLICATIONS

International Search Report issued in related International Application No. PCT/US2023/032869 dated Jul. 29, 2024.

* cited by examiner

METHOD AND SYSTEM FOR EXTRACTING BLACK MASS FROM SPENT LITHIUM ION BATTERIES

CROSS-REFERENCE TO RELATED APPLICATIONS

The present application claims priority to U.S. Provisional Patent application No. 63/407,265, filed on Sep. 16, 2022, which is incorporated herein by reference in its entirety.

FIELD

The present disclosure relates generally to the field of recycling of spent lithium ion batteries, and in particular to systems and methods for extraction of black mass from spent lithium ion batteries.

BACKGROUND

The adoption of electric powered equipment such as automobile and power tools has grown rapidly over the past decade. Vast majority of the electric powered equipment use lithium-based batteries. Given the working life of lithium-based batteries, the number of spent lithium-based batteries is projected to grow exponentially in the coming years. Moreover, the amount of metals and other natural resources that are used as raw materials for lithium-based batteries is finite. Consequently, recycling of spent lithium-based batteries to recover valuable metals can become an important source for the raw materials. Additionally, because the materials used in lithium-batteries can cause pollution of water and other resources if left in landfills, recycling of spent lithium-based battery is also environmentally important. Development of economically viable methods of recycling the spent batteries is, therefore, necessary to keep the cost of the raw materials (and consequently, of the batteries) affordable and prevent pollution caused by the materials from spent lithium-based batteries.

The electrodes of lithium-based batteries are formed primarily of metals such as copper, iron and aluminum depending on the specific battery chemistry being used. Lithium-based batteries also include what is typically known as black mass, which generally includes graphite and salts of several valuable metals such as iron, cobalt, manganese, nickel, copper and aluminium (depending on the specific battery chemistry). The black mass also includes salts of lithium, which forms less than about 1% of the weight of the scrap battery, and typically less than about 2% of the weight of the active mass of the battery. The black mass for some of the novel battery chemistries may also include other metals, such as rare earths, in trace amounts.

Pyrochemical processes are the most widely utilized techniques for recycling spent lithium batteries. Such pyrochemical processes utilize smelting which requires high temperatures, e.g., in a range from about 500° C. to about 1000° C. As a result, the energy costs associated with the recycling process are high, resulting in the cost of recovery of metals to be substantially higher than the market value of the recovered metals. Further, the gases produced during smelting are often hazardous and also add to environmental pollution. Furthermore, the amount of each metal recovered via pyrochemical processes is typically lower compared to, e.g., hydrometallurgical processes. These technologies are, therefore, unsustainable in the long term.

Some hydrometallurgical processes can provide higher yields, and potentially higher purity of recovered metals. However, these processes generally require heating a leaching solvate for a long time at relatively higher temperatures, e.g., in a range from about 80° C. to about 150° C. Thus, the energy requirements of such processes remains high. Moreover, handling of high temperature leaching solvates poses certain hazards which further increase the cost of such processes.

Consequently, current technologies for recycling spent batteries are not cost-effective relative to the technology for obtaining these materials anew. Cost-effective, low energy, sustainable, and low carbon-footprint technologies for recovering materials from spent batteries are, therefore, needed.

SUMMARY

The embodiments disclosed herein stem from the realization that high temperature and/or pyrochemical techniques are not necessary for efficient recovering metals from a spent lithium ion battery. The present application discloses systems and methods for extracting black mass, using a leaching solvent, from spent lithium ion batteries. Because the leaching solvent used in the presently disclosed embodiments is an aqueous solution, microwave radiation can be utilized to reduce the time and energy required to heat the leaching solvent to a suitable temperature and to maintain the temperature of the leaching solvent so as to separate black mass from any salts and metals mixed therewith. The embodiments also utilize a leaching solvent comprising an oxidizing agent for further increasing the efficiency of separating metals and salts from the black mass.

The leaching solvent of the presently disclosed embodiments is selected such that it can dissolve the various metals used in a lithium ion battery. Thus, pieces of a spent lithium ion battery are contacted with the leaching solvent at a suitable temperature, the various metals from the battery are dissolved into the leaching solvent, leaving behind the black mass. The embodiments disclosed herein further utilize the realization that once the various metals are dissolved in the leaching solvent, black mass can be separated from the leaching solvent by filtration. Thus, advantageously, the embodiments disclosed herein enable extraction of black mass present in a lithium ion battery without having to use a pyrochemical process, thereby substantially reducing the time, cost and carbon footprint for recovery of metals from a lithium ion battery.

Further, the leachate separated from the black mass includes salts of various valuable metals and may be processed further to obtain high purity valuable metals.

Accordingly, in at least one embodiment, a method of extracting black mass from a spent lithium-ion (Li-ion) battery includes contacting a leaching solvent to a portion of the spent Li-ion battery to obtain a first dispersion. The first dispersion is heated to a temperature in a range from 50° C. to 90° C. by applying microwave radiation. The temperature of the first dispersion is maintained to be in the range from 50° C. to 90° C. for a period in a range from 10 seconds to 5 minutes by further applying microwave radiation to the heated electrode dispersion. The first dispersion is then filtered to separate undissolved material from a first filtrate. The undissolved precipitate is dehydrated to obtain the black mass.

In accordance with at least one embodiment, a system for recycling a spent Li-ion battery may include a crusher, a cleaning chamber, one or more storage tanks, two or more reaction chambers, and a controller. The crusher is configured to break a cell of the spent Li-ion battery into pieces. The cleaning chamber is configured to clean the pieces, e.g., using water and/or other neutral solvent(s). The one or more storage tanks are configured to store chemicals and may include at least one first storage tank storing a first base. The two or more reaction chambers are coupled to the one or more storage tanks via one or more pumps and valves. At least a first of the two or more reaction chambers is coupled to a microwave generator (e.g., comprising a magnetron) configured to provide microwave generation to reactants in the first reaction chamber, and at least a second of the two or more reaction chambers is coupled to the first storage tank. The controller is configured to control the one or more pumps and/or the one or more valves to modulate a rate of transfer and amount of chemicals being transferred from the one or more storage tanks to a corresponding of the two or more reaction chambers. The controller is further configured to control the microwave generator to modulate an amount of microwave radiation provided to the first reaction chamber so as to heat the reactants in the first reaction chamber to a temperature in a predetermined range and maintain the temperature of the reactants to be in the predetermined range for a predetermined period of time. Precipitate and undissolved material from the first reaction chamber is separated from the solvent to obtain black mass.

Additional features and advantages of the subject technology will be set forth in the description below, and in part will be apparent from the description, or may be learned by practice of the subject technology. The advantages of the subject technology will be realized and attained by the structure particularly pointed out in the written description and embodiments hereof as well as the appended drawings.

It is to be understood that both the foregoing general description and the following detailed description are exemplary and explanatory and are intended to provide further explanation of the subject technology.

BRIEF DESCRIPTION OF THE DRAWINGS

Various features of illustrative embodiments of the present disclosure are described below with reference to the drawings. The illustrated embodiments are intended to illustrate, but not to limit, the present disclosure. The drawings contain the following figures.

DETAILED DESCRIPTION

Figure 1:
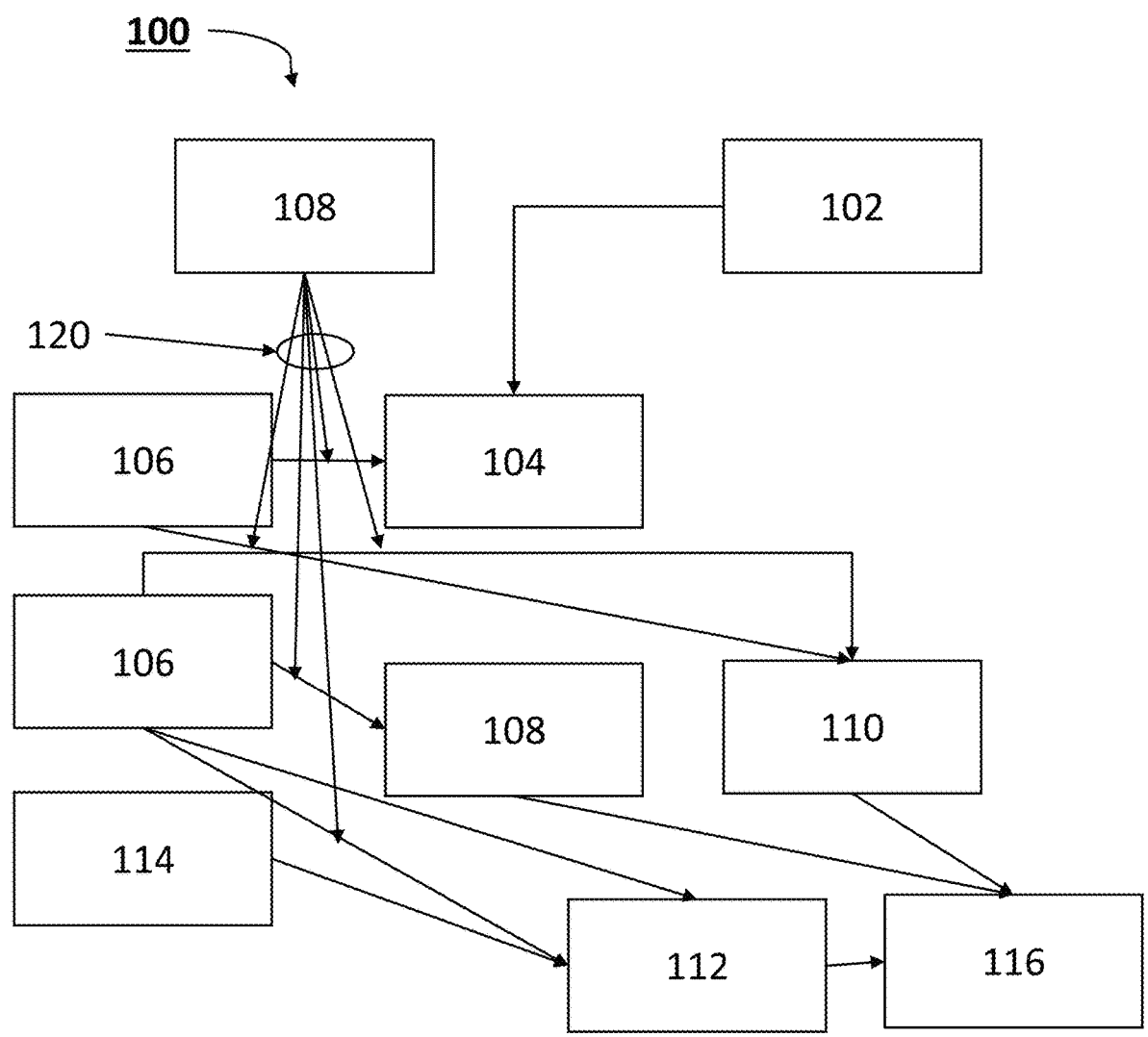
FIG. 1 schematically shows an apparatus for recycling a spent lithium ion battery in accordance with at least some embodiments of the present disclosure.

In the following detailed description, numerous specific details are set forth to provide a full understanding of the subject technology. It should be understood that the subject technology may be practiced without some of these specific details. In other instances, well-known structures and techniques have not been shown in detail so as not to obscure the subject technology.

Further, while the present description sets forth specific details of various embodiments, it will be appreciated that the description is illustrative only and should not be construed in any way as limiting. Additionally, it is contemplated that although particular embodiments of the present disclosure may be disclosed or shown in the context of recycling certain types of lithium ion batteries, such embodiments can be used with all types of lithium ion batteries using modifications within the scope of the present disclosure and claims. Furthermore, various applications of such embodiments and modifications thereto, which may occur to those who are skilled in the art, are also encompassed by the general concepts described herein.

A typical lithium-ion battery, depending on the battery chemistry used, may contain graphite powder, and salts of one or more valuable metals such as lithium, aluminum, copper, cobalt, manganese, nickel, iron, and the like. Some of the commonly used lithium-ion battery types and the content of graphite and various metals in those battery types is provided in tables 1-6.

TABLE 1

Lithium Cobalt Oxide (LCO) batteries
LCO

| Components | % |
|---|---|
| With Respect to Scrap | |
| Aluminum | 8.00% |
| Copper | 17.00% |
| Graphite (anode) | 16.00% |
| Active cathode material | 24.00% |
| Compositions in Active Mass | |
| Lithium | 1.70% |
| Cobalt | 14.45% |
| Nickel | 0.00% |
| Aluminum | 0.00% |
| Oxygen | 7.85% |
| Composition With Respect to Black Mass | |
| Al (foil particles) | 0.97% |
| Cu (foil particles) | 2.06% |
| Graphite | 38.79% |
| Lithium | 4.12% |
| Cobalt | 35.03% |
| Nickel | 0.00% |
| Aluminum | 0.00% |
| Oxygen | 19.03% |
| Other Variables | |
| % of Al and Cu retained in black mass | 5.00% |

TABLE 2

Lithium Nickel Cobalt Aluminum (LNCA) batteries
LNCA

| Components | % |
|---|---|
| With Respect to Scrap | |
| Aluminum | 8.00% |
| Copper | 17.00% |
| Graphite (anode) | 16.00% |
| Active cathode material | 24.00% |
| Compositions in Active Mass | |
| Lithium | 1.73% |
| Cobalt | 2.20% |
| Nickel | 11.73% |
| Aluminum | 0.34% |
| Oxygen | 7.99% |
| Composition With Respect to Black Mass | |
| Al (foil particles) | 0.97% |
| Cu (foil particles) | 2.06% |
| Graphite | 38.79% |
| Lithium | 4.19% |
| Cobalt | 5.33% |
| Nickel | 28.43% |
| Aluminum | 0.82% |
| Oxygen | 19.37% |
| Other Variables | |
| % of Al and Cu retained in black mass | 5.00% |

TABLE 3

Nickel Manganese Cobalt 1/3 proportion each in the active cathode (NMC111) batteries
NMC111

| Components | % |
|---|---|
| With Respect to Scrap | |
| Aluminum | 8.00% |
| Copper | 17.00% |
| Graphite (anode) | 16.00% |
| Active cathode material | 24.00% |
| Compositions in Active Mass | |
| Lithium | 1.73% |
| Cobalt | 4.89% |
| Nickel | 4.86% |
| Manganese | 4.56% |
| Oxygen | 7.96% |
| Composition With Respect to Black Mass | |
| Al (foil particles) | 0.97% |
| Cu (foil particles) | 2.06% |
| Graphite | 38.79% |
| Lithium | 4.19% |
| Cobalt | 11.85% |
| Nickel | 11.78% |
| Manganese | 11.05% |
| Oxygen | 19.30% |
| Other Variables | |
| % of Al and Cu retained in black mass | 5.00% |

TABLE 4

Nickel Manganese Cobalt 60/20/20% proportion each in the active cathode (NMC622) batteries
NMC622

| Components | % |
|---|---|
| With Respect to Scrap | |
| Aluminum | 8.00% |
| Copper | 17.00% |
| Graphite (anode) | 16.00% |
| Active cathode material | 24.00% |
| Compositions in Active Mass | |
| Lithium | 1.72% |
| Cobalt | 2.92% |
| Nickel | 8.72% |
| Manganese | 2.72% |
| Oxygen | 7.92% |
| Composition With Respect to Black Mass | |
| Al (foil particles) | 0.97% |
| Cu (foil particles) | 2.06% |
| Graphite | 38.79% |
| Lithium | 4.17% |
| Cobalt | 7.08% |
| Nickel | 21.14% |
| Manganese | 6.59% |
| Oxygen | 19.20% |
| Other Variables | |
| % of Al and Cu retained in black mass | 5.00% |

TABLE 5

Nickel Manganese Cobalt 80/10/10% proportion each in the active cathode (NMC811) batteries
NMC811

| Components | % |
|---|---|
| With Respect to Scrap | |
| Aluminum | 8.00% |
| Copper | 17.00% |
| Graphite (anode) | 16.00% |
| Active cathode material | 24.00% |
| Compositions in Active Mass | |
| Lithium | 1.71% |
| Cobalt | 1.46% |
| Nickel | 11.58% |
| Manganese | 1.36% |
| Oxygen | 7.89% |
| Composition With Respect to Black Mass | |
| Al (foil particles) | 0.97% |
| Cu (foil particles) | 2.06% |
| Graphite | 38.79% |
| Lithium | 4.15% |
| Cobalt | 3.54% |
| Nickel | 28.07% |
| Manganese | 3.30% |
| Oxygen | 19.13% |
| Other Variables | |
| % of Al and Cu retained in black mass | 5.00% |

TABLE 6

Lithium Iron Phosphate (LFP) batteries
LFP

| Components | % |
|---|---|
| With Respect to Scrap | |
| Aluminum | 8.00% |
| Copper | 17.00% |
| Graphite (anode) | 15.30% |
| Active cathode material | 22.20% |
| Compositions in Active Mass | |
| Lithium | 0.98% |
| Iron | 7.86% |
| Phosphorus | 4.35% |
| Oxygen | 9.00% |
| Composition With Respect to Black Mass | |
| Al (foil particles) | 1.032% |
| Cu (foil particles) | 2.19% |
| Graphite | 39.48% |
| Lithium | 2.53% |
| Iron | 20.28% |
| Phosphorus | 11.23% |
| Oxygen | 23.23% |
| Other Variables | |
| % of Al and Cu retained in black mass | 5.00% |

As evident from Tables 1-6, graphite forms a substantial portion of spent Li-ion batteries. The technology disclosed herein makes it possible to recover graphite and other materials included in the black mass from a spent Li-ion battery economically, sustainably, and at scale. The methods disclosed herein have low energy requirements, thereby reducing the carbon footprint of the recycling process. Further, the methods disclosed herein provide high-purity graphite and enable extraction of valuable metals from the black mass by further processing, which can advantageously used directly in manufacturing Li-ion batteries instead of obtaining graphite from other sources.

FIG. 1 shows a schematic diagram of an apparatus 100 for recycling a spent lithium ion battery in accordance with at least some embodiments of the present disclosure. In some embodiments, the apparatus 100 includes a crusher 102, a cleaning chamber 104, one or more chemical storage tanks 106, a controller 108, one or more reaction chambers such as, e.g., a separation chamber 110, a precipitation chamber 112, one or more clean water tanks 114, one or more recycled water tanks 116, and one or more pumps 120.

In some embodiments, the crusher 102 is designed to break a cell of a spent lithium ion battery (also referred to herein as "spent battery" for convenient reference) into pieces having a dimension in a range from about 1 mm to about 5 cm. In some embodiments, the crusher 102 may include a chamber that can be sealed and evacuated to reduce the amount of oxygen in the chamber, thereby preventing oxidation of the pieces of the spent battery. In some embodiments, the chamber may be repressurized using an inert gas such as, for example, nitrogen or argon.

The cleaning chamber 104, in some embodiments, is designed to clean the pieces of the spent battery obtained from the crusher 102. Cleaning the pieces may include processes such as, for example, washing the pieces with water (e.g., distilled water), sonicating the pieces while in water or after drying the washed pieces, drying the washed and/or sonicated pieces, and the like.

In some embodiments, cleaning may be performed at room temperature or at an elevated temperature. In some embodiments, cleaning may be performed in air at atmospheric pressure. Alternatively or additionally, cleaning may be performed under a vacuum and/or in an inert atmosphere such as, for example, in presence of nitrogen, argon, or the like.

In some embodiments, cleaning the pieces may include dispersing the pieces of the spent battery in a fluid and filtering the pieces using one or more filtration processes such as, for example, using one or more meshes, each having a different mesh size. In some embodiments, the mesh size may range from about 50 µm to about 5 mm. For example, a filtration process may include sequential filtering of the dispersion through a mesh having a mesh size of about 5 mm, followed by filtering through a mesh having a mesh size of about 1 mm, followed by filtering through a mesh having a mess size of about 500 µm, followed by filtering through a mesh having a mesh size of about 50 µm. In some embodiments, one or more of these steps may be omitted. Alternatively or additionally, one or more filtration steps may be added in the process.

In some embodiments, the material separated after filtering through relatively smaller mesh sizes may be removed for further processing such as, for example, contacting the material with chemicals such as leaching chemicals, acids, neutralizing solutions (e.g., alkali solutions, acid solutions, salt solutions, etc.), water, and/or other proprietary solutions that include one or more chemicals useful in the recycling process. In some embodiments, undissolved material after further processing may be further separated and dried to obtain graphite powder.

In some embodiments, the one or more storage tanks 106 may store chemicals such as leaching chemicals, acids, neutralizing solutions (e.g., alkali solutions, acid solutions, salt solutions, etc.), water, and/or other proprietary solutions that include one or more chemicals useful in the recycling process.

In some embodiments, each of the one or more storage tanks 106 may be connected to two or more reaction chambers 110, 112. Further, the connection between a storage tank and a reaction chamber may include a control valve which can be controlled by a controller 108. The controller 108 is configured to control, via the control valve (or other mechanism), the amount of chemical transferred from the storage tank 106 to the reaction chambers 110, 112. For example, the controller 108 may control parameters such as, volume and/or flow rate of the chemical being transferred from the storage tank to the corresponding reaction chamber.

In some embodiments, the controller 108 may utilize a control parameter such as, for example, pH, temperature, volume, turbidity, density, and/or other parameters associated with a chemical in a given reaction chamber to control the volume, mass, and/or flow rate of chemicals being transferred from the storage tank to the given reaction chamber. Consequently, the system 100 may further include one or more sensors for measuring one or more corresponding control parameters and measuring one or more of the controlled parameters (e.g., volume, mass, flow rate, etc.).

In some embodiments, the controller 108 may control the temperature of the material in the reaction chamber, e.g., by controlling the amount of heat delivered to one of the reaction chambers or the material within the reaction chamber. For example, in some embodiments, the controller 108 may control power input to a microwave generator (e.g., comprising a magnetron) coupled to one of the reaction chambers so as to control an amount of microwave energy delivered to the material in the reaction chamber. The controller 108 may control the power input based on parameters such as, for example, the temperature of the material in the reaction chamber.

In some embodiments, the two or more reaction chambers may be connected to a clean water tank 114. The connection between the reaction chambers and the clean water tank may be controlled by a control valve in some embodiments. Similar to the connection between the reaction chambers and the storage tanks, the controller 108 may control, via the control valve, the amount and/or flow rate of water transferred from the clean water tank 114 to the reaction chambers based on parameters such as pH, temperature, volume, turbidity, density, and/or other parameters associated with the chemical in a given reaction chamber.

The two or more reaction chambers are further connected to a recycled water tank 116 in some embodiments. Upon completion of the reaction in the reaction chambers, any solid material generated, e.g., precipitated and/or separated in a given reaction chamber is removed. Solid material may be removed, e.g., by filtration. In some embodiments, the remainder of the chemical, e.g., a filtrate, is neutralized using, e.g., a neutralizing solution which is introduced into the reaction chamber from a corresponding storage tank via control of a control valve by the controller.

In some embodiments, the neutralization process may be performed in several steps by sequentially increasing a pH of the filtrate by gradually adding the neutralizing solution so as to sequentially precipitate out different materials. For example, a first precipitate (e.g., a first metal salt) may be obtained at a first pH, a second precipitate may be obtained at a second pH and so forth. In such embodiments, the amount and flow rate of the neutralizing solution added to the reaction chamber may be controlled by the control valve based on a pH of the contents in the reaction chamber. In some embodiments, instead of a neutralizing solution, a neutralizing chemical, e.g., in solid state, may be added to the reaction chamber to increase the pH of the contents of the reaction chamber.

In some embodiments, after all possible precipitates resulting from the neutralization reaction are removed, e.g., by filtration, the remaining water may be further treated to bring its pH to a neutral pH following which, it may be transferred to a recycled water storage tank 116.

In some embodiments, the transfer of material to or from one or more of the storage tanks 106, the reaction chambers 110, 112, the clean water tank 114 and/or the recycled water tank 116 may be facilitated by one or more pumps 120. In some embodiments, the one or more pumps 120 are coupled to the controller 108 which can control the one or more pumps 120 so as to control the rate of flow and/or volume of the material being transferred.

In an aspect of the present disclosure, a suitable apparatus such as, for example, the apparatus 100, may be utilized for recycling spent batteries. In particular, in some embodiments, an apparatus such as apparatus 100 may be utilized for extracting black mass found in spent Li-ion batteries. The black mass may be further processed to obtain graphite and salts of valuable metals such as, for example, salts of lithium, aluminum, copper, iron, nickel, cobalt and manganese.

Figure 2:
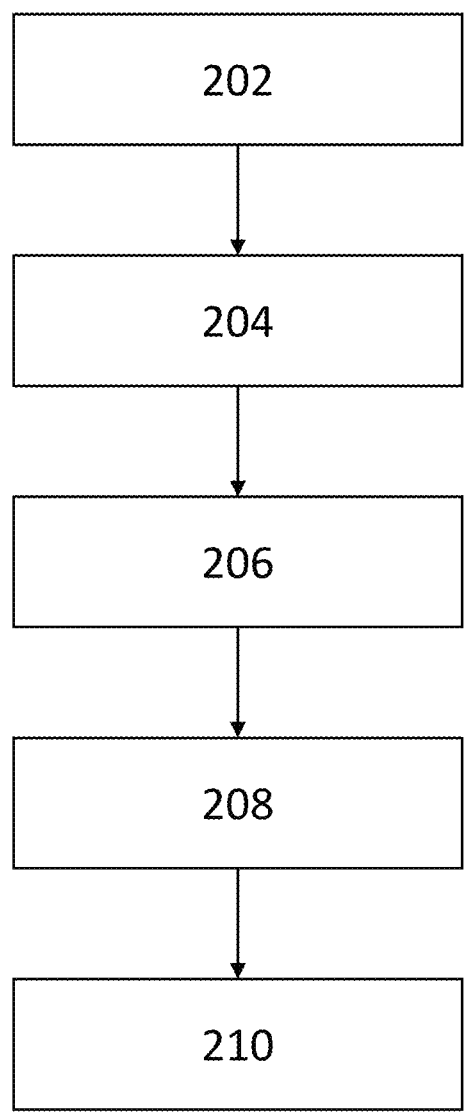
FIG. 2 shows a flow chart for a method of obtaining a metal salt from a spent lithium ion battery, in accordance with at least some embodiments of the present disclosure.

FIG. 2 illustrates a flow chart of a method 200 for extracting black mass from spent lithium ion batteries, in accordance with at least some embodiments of the present disclosure. The method 200 may include, at 202, contacting a leaching solvent to a portion of the spent Li-ion battery to obtain a first dispersion. The first dispersion is heated, at 204, to a temperature in a range from about 50° C. to about 90° C. by applying microwave radiation to the first dispersion. At 206, the temperature of the heated first dispersion is maintained to be in a range from about 50° C. to about 90° C. for a period in a range from about 10 seconds to about 5 minutes via controlled application of microwave radiation. At 208, the first dispersion is filtered to separate a first filtrate from undissolved material. At 210, the undissolved material is segregated to obtain metal pieces and black mass.

In some embodiments, the portion of the spent Li-ion battery is obtained by crushing a lithium ion battery. The process for obtaining a suitable portion of the Li-ion battery may further include steps such as, for example, separation of the crushed portion via a sequence of segregating steps so as to separate material of different sizes. For example, in some embodiments, the separation may include separating coarse pieces having a size in a range from about 0.5 mm to about 5 mm by utilizing a suitable sieve, followed by further separating finer pieces having a size in a range from about 50 µm to about 0.5 mm by utilizing a second suitable sieve. In some embodiments, several (e.g., 3, 4, 5, 6, 7 or more) segregation steps may be performed using sieves of different mesh sizes.

The portion of the spent Li-ion battery, e.g., fine pieces and/or black mass, may be introduced in a reaction chamber where, at 202, the fine pieces and/or black mass (together referred to hereinafter as "black mass" for convenient reference) are contacted with a leaching solvent. In some embodiments, the leaching solvent may include an acid such as, for example, sulfuric acid, hydrochloric acid, oxalic acid, etc. In some embodiments, the leaching solvent may include more than one acid.

In some embodiments, the leaching solvent may further include an oxidizing agent such as, for example, hydrogen peroxide or nitric acid. In some embodiments, the concentration of the leaching solvent acid may be in a range from about 0.5 N to about 10 N. In some embodiments, the pH of the leaching solvent may be in a range from about 0 to about 7.0. In some embodiments, the leaching solvent may have a pH of about 0. In some embodiments, the leaching solvent is introduced into the reaction chamber from a storage tank. The amount and/or flow rate of introduction of the leaching solvent may be controlled via a controller.

Table 7 provides the concentration for various materials used in the leaching solvent according to one example.

TABLE 7 specifications for leaching solvent according to an example.
Specifications of Leaching Solvent
Concentrations

| | |
|---|---|
| Sulfuric | 29% |
| L/S ratio | 10.00 |
| % of $H_2O_2$ | 3% |
| % of Proprietary reagent | 5% |

Upon introduction of the leaching solvent to the reaction chamber, the leaching solvent and the black mass are stirred, e.g., using a stirrer (which may or may not be controlled by a controller), to form a first dispersion.

Microwave radiation is then applied, at 204, to the first dispersion so as to heat the first dispersion to a temperature in a range from about 50° C. to about 90° C. Thus, at 206, the first dispersion may be heated to a temperature of, e.g., about 50° C., about 55° C., about 60° C., about 65° C., about 70° C., about 75° C., about 80° C., about 85° C., about 90° C., or any temperature between any two of these values.

In some embodiments, the application of the microwave radiation is controlled by a controller which uses a temperature in the reaction chamber as a feedback parameter. The temperature in the reaction chamber may be determined, e.g., by a temperature sensor disposed in the reaction chamber. The temperature sensor may be coupled to the controller. In some embodiments, the controller may be a proportional-integral-derivative (PID) controller, although other types of controllers are contemplated within the scope of the present disclosure.

In addition, in some embodiments, the first dispersion in the reaction chamber is stirred while being heated. Stirring of the first dispersion may be helpful in distributing the heat generated by application of microwave radiation more evenly through the first dispersion. Additionally or alternately, the first dispersion may be sonicated by application of, e.g., ultrasound, during the heating process.

Once the temperature of the first dispersion reaches a desired value, at 208, application of microwave radiation is continued so as to maintain the temperature at the desired value for a period in a range from about 10 seconds to about 5 minutes. For example, the temperature of the first dispersion may be maintained at the desired value for about 10 seconds, about 15 seconds, about 20 seconds, about 25 seconds, about 30 seconds, about 35 seconds, about 40 seconds, about 45 seconds, about 50 seconds, about 55 seconds, about 60 seconds, about 70 seconds, about 80 seconds, about 90 seconds, about 100 seconds, about 120 seconds, about 140 seconds, about 160 seconds, about 180 seconds, about 200 seconds, about 220 seconds, about 240 seconds, about 260 seconds, about 280 seconds, about 300 seconds or any amount of time between any two of these values.

In some embodiments, the continued application of microwave radiation at 204 is controlled using a controller such as, for example, the same controller used in 204. It will be appreciated that the continued application of microwave radiation does not necessarily mean constant application of microwave radiation. Thus, in some embodiments, at 206, the microwave radiation may be applied in pulses. Each pulse may have a pulse width ranging from about 0.5 seconds to 5 seconds or longer. The microwave pulses may or may not have the same peak power. Thus, in some embodiments, the continued application of microwave radiation may include application of pulsed waves of microwave radiation and controlling parameters such as, for example, pulse width, peak power for the pulse, pulse rate and the total amount of time for which the microwave radiation is applied to the first dispersion.

In addition, at 206, the first dispersion may be stirred and/or sonicated using ultrasound so as to disperse the heat generated from application of microwave radiation more uniformly through the first dispersion.

After maintaining the temperature of the first dispersion for predetermined period of time, the first dispersion, at 208, the first dispersion may be allowed to cool to room temperature. The first dispersion is then filtered to separate undissolved material from a first filtrate. In some embodiments, the first dispersion may be cooled to room temperature prior to filtering at 208. In some embodiments, filtering the first dispersion may include passing the first dispersion through a fine filter, mesh or sieve. In some embodiments, the filtering process is enabled to separate material larger than a predetermined size from the first filtrate. For example, the filtering process may separate any material larger than, e.g., about 1 μm, about 5 μm, about 10 μm or about 50 μm, from the first filtrate.

It will be appreciated that the salts of valuable metals from the black mass may dissolve in the leaching solvent. Thus, at the end of 208, the undissolved material includes insoluble portion of the black mass, which may primarily include graphite and undissolved metal pieces. On the other hand, the first filtrate may include metal ions. Without wishing to be bound by theory, the metal ions in the first filtrate are in the highest oxidation state because of the presence of the oxidizing agent in the leaching solvent.

The undissolved material is then segregated, at 210, to obtain undissolved metal pieces and graphite. In some embodiments, segregating the undissolved material includes sequentially passing a dispersion comprising the undissolved material through one or more sieves of different sizes.

In some embodiments, the filters, meshes or sieves may be designed or selected to enable separation of solid matter having different sizes. For example, the a first mesh, filter or sieve may separate solid matter having a size greater than about 1 mm; a second mesh, filter or sieve may separate solid matter having a size in a range from about 0.5 mm to about 1 mm; a third mesh, filter or sieve may separate solid matter having a size in a range from about 0.1 mm to about 0.5 mm; a fourth mesh, filter or sieve may separate solid matter having a size in a range from about 50 μm to about 100 μm; a fifth mesh, filter or sieve may separate solid matter having a size in a range from about 10 μm to about 50 μm; a sixth mesh, filter or sieve may separate solid matter having a size in a range from about 1 μm to about 10 μm; and so forth.

In some embodiments, the material (also referred to herein as "the powder") obtained following segregation using the smallest filter, mesh or sieve is further processed to obtain graphite. For example, the powder may be washed in one or more washing cycles using water, a dilute acid and/or a dilute base to remove any adsorbed salts or metals. The washed powder may then be dehydrated to obtain graphite powder.

Thus, the present disclosure provides a system and method for obtaining black mass including graphite from spent lithium ion batteries. Advantageously, the graphite powder so obtained via the process disclosed herein already meets the specifications for use in lithium-based batteries. Consequently, the graphite powder obtained via the process disclosed herein may be utilized as-is for manufacturing of lithium-based batteries.

The method disclosed herein is a low temperature method that uses microwave radiation to heat a dispersion of black mass to improve energy efficiency. Further, because the process does not require smelting or other high temperature processes, there are no emitted gases, the process is essentially a zero-pollution process. Additionally, the water used in the process can also be recycled, thereby further reducing waste.

EXAMPLES 100 kg of LCO, LNCA, NMC111, NMC622, NMC811 and LFP (25 wt % contribution) batteries were recycled using the method disclosed herein to recover electrode metals.

Table 9 provides the amount electrode metals recovered following the process.

TABLE 9

Amounts of graphite recovered from the extraction process described herein.

| Battery Type | Amount (kg) |
| --- | --- |
| LCO | 387.88 |
| LNCA | 387.88 |
| NMC111 | 387.88 |
| NMC622 | 387.88 |
| NMC811 | 387.88 |
| LFP | 394.84 |

Further Considerations

In some embodiments, any of the clauses herein may depend from any one of the independent clauses or any one of the dependent clauses. In one aspect, any of the clauses (e.g., dependent or independent clauses) may be combined with any other one or more clauses (e.g., dependent or independent clauses). In one aspect, a claim may include some or all of the words (e.g., steps, operations, means or components) recited in a clause, a sentence, a phrase or a paragraph. In one aspect, a claim may include some or all of the words recited in one or more clauses, sentences, phrases or paragraphs. In one aspect, some of the words in each of the clauses, sentences, phrases or paragraphs may be removed. In one aspect, additional words or elements may be added to a clause, a sentence, a phrase or a paragraph. In one aspect, the subject technology may be implemented without utilizing some of the components, elements, functions or operations described herein. In one aspect, the subject technology may be implemented utilizing additional components, elements, functions or operations.

The subject technology is illustrated, for example, according to various aspects described below. Various examples of aspects of the subject technology are described as numbered clauses (1, 2, 3, etc.) for convenience. These are provided as examples and do not limit the subject technology. It is noted that any of the dependent clauses may be combined in any combination, and placed into a respective independent clause, e.g., clause 1 or clause 5. The other clauses can be presented in a similar manner.

Clause 1. A method of extracting black mass from a spent lithium-ion (Li-ion) battery, the method comprising: contacting a leaching solvent to a portion of the spent Li-ion battery to obtain a first dispersion; heating the first dispersion to a temperature in a range from 50° C. to 90° C. by applying microwave radiation; maintaining the temperature of the first dispersion in the range from 50° C. to 90° C. for a period in a range from 10 seconds to 5 minutes by further applying microwave radiation to the heated first dispersion; filtering the first dispersion to separate a first filtrate from undissolved material; and segregating the undissolved material to obtain metal pieces and the black mass.

Clause 2. The method of clause 1, wherein the black mass comprises graphite.

Clause 3. The method of clause 1, wherein the leaching solvent comprises sulfuric acid.

Clause 4. The method of clause 3, wherein the leaching solvent further comprises an oxidizing agent.

Clause 5. The method of clause 4, wherein the oxidizing agent is hydrogen peroxide.

Clause 6. The method of clause 1, wherein the leaching solvent has a pH in a range from 0 to 7.0

Clause 7. The method of clause 1, wherein heating the first dispersion further comprises stirring the first dispersion while applying the microwave radiation.

Clause 8. The method of clause 1, wherein maintaining the temperature of the first dispersion comprises controlling application of the microwave radiation using a controller.

Clause 9. The method of clause 1, wherein heating the first dispersion comprises heating the first dispersion to a temperature in a range from 60° C. to 80° C.

Clause 10. The method of clause 1, wherein maintaining the temperature comprises maintaining the temperature of the first dispersion in a range from 60° C. to 80° C., for a period in a range from 30 seconds to 5 minutes.

Clause 11. The method of clause 1, wherein the portion of the spent lithium-ion battery comprises metal pieces, and a black mass comprising graphite and metal oxides.

Clause 12. The method of clause 11, wherein filtering the first dispersion comprises filtering the first dispersion through a sieve.

Clause 13. The method of clause 1, wherein heating the first dispersion further comprises continuously stirring the first dispersion while applying the microwave radiation.

Clause 14. The method of clause 1, wherein maintaining the temperature of the first dispersion further comprises continuously stirring the first dispersion while applying the microwave radiation.

Clause 15. The method of clause 1, wherein segregating the undissolved material comprises sequentially passing a dispersion comprising the undissolved material through one or more sieves of different sizes.

Clause 16. The method of clause 15, wherein the one or more sieves have a mesh size in a range from about 5 mm to about 0.01 mm.

Clause 17. The method of clause 16, further comprising drying a remainder undissolved material after passing the dispersion through a sieve having the smallest mesh size to obtain a graphite powder.

Clause 18. A system for recycling a spent lithium ion battery, the system comprising: a crusher configured to break a cell of the spent lithium ion battery into pieces; one or more storage tanks configured to store chemicals, including at least one first storage tank storing a first base; one or more reaction chambers coupled to the one or more storage tanks via one or more pumps and valves, a first of the one or more reaction chambers being coupled to a microwave generator configured to provide microwave radiation to reactants in the first reaction chamber; a separator configured to segregate undissolved material from the first reaction chamber; and a controller. The controller is configured to control: the one or more pumps and/or the one or more valves to modulate rate of transfer and amount of chemicals being transferred from the one or more storage tanks to a corresponding of the one or more reaction chambers, and the microwave generator to modulate an amount of microwave radiation provided to the first reaction chamber so as to heat the reactants in the first reaction chamber to a temperature in a predetermined range, and maintain the temperature of the reactants to be in the predetermined range for a predetermined period of time. The pieces are disposed in the first reaction chamber to be contacted with a leaching solvent.

Clause 19. The system of clause 18, wherein at least one of the one or more reaction chambers includes a stirrer configured to stir the reactants therein.

Clause 20. The system of clause 18, wherein the crusher comprises a chamber configured to be maintained under vacuum and/or have an inert atmosphere.

Clause 21. The system of clause 18, wherein the leaching solvent comprises sulfuric acid and an oxidizing agent.

Clause 22. The system of clause 18, wherein the predetermined temperature range is from 50° C. to 90° C.

Clause 23. The system of clause 18, wherein the predetermined period of time is in a range from 10 seconds to 5 minutes.

Clause 24. The system of clause 18, wherein the leaching solvent has a pH in a range from 0 to 7.0.

Clause 25. The system of clause 18, wherein maintaining the temperature comprises maintaining the temperature of the electrode dispersion in a range from 60° C. to 80° C., for a period in a range from 30 seconds to 5 minutes.

Clause 26. The system of clause 18, wherein the separator comprises one or more sieves of different sizes through which a dispersion of the undissolved material is sequentially passed.

Clause 27. The system of clause 26, wherein the one or more sieves have a mesh size in a range from about 5 mm to about 0.01 mm.

Clause 28: The system of clause 18, wherein the microwave generator comprises a magnetron.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

As used herein, the term "about" preceding a quantity indicates a variance from the quantity. The variance may be caused by manufacturing tolerances or may be based on differences in measurement techniques. The variance may be up to 10% from the listed value in some instances. Those of ordinary skill in the art would appreciate that the variance in a particular quantity may be context dependent and thus, for example, the variance in a dimension at a micro or a nano scale may be different than variance at a meter scale.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A method of extracting black mass from a spent lithium-ion (Li-ion) battery, the method comprising:
   contacting a leaching solvent to a portion of the spent Li-ion battery comprising black mass, metal oxide and metal pieces to obtain a first dispersion, wherein the black mass includes graphite and a lithium salt;
   heating the first dispersion to a temperature in a range from 50° C. to 90° C. by applying microwave radiation;
   maintaining the temperature of the first dispersion in the range from 50° C. to 90° C. for a period in a range from 10 seconds to 5 minutes by further applying microwave radiation to the heated first dispersion;
   filtering the first dispersion to separate a first filtrate from undissolved material; and
   segregating the undissolved material to obtain metal pieces and the black mass.

2. The method of claim 1, wherein the leaching solvent comprises sulfuric acid.

3. The method of claim 2, wherein the leaching solvent further comprises an oxidizing agent.

4. The method of claim 3, wherein the oxidizing agent is hydrogen peroxide.

5. The method of claim 1, wherein the leaching solvent has a pH in a range from 0 to 7.0.

6. The method of claim 1, wherein heating the first dispersion further comprises stirring the first dispersion while applying the microwave radiation.

7. The method of claim 1, wherein maintaining the temperature of the first dispersion comprises controlling application of the microwave radiation using a controller.

8. The method of claim 1, wherein heating the first dispersion comprises heating the first dispersion to a temperature in a range from 60° C. to 80° C.

9. The method of claim 1, wherein maintaining the temperature comprises maintaining the temperature of the first dispersion in a range from 60° C. to 80° C., for a period in a range from 30 seconds to 5 minutes.

10. The method of claim 1, wherein filtering the first dispersion comprises filtering the first dispersion through a sieve.

11. The method of claim 1, wherein heating the first dispersion further comprises continuously stirring the first dispersion while applying the microwave radiation.

12. The method of claim 1, wherein maintaining the temperature of the first dispersion further comprises continuously stirring the first dispersion while applying the microwave radiation.

13. The method of claim 1, wherein segregating the undissolved material comprises sequentially passing a dispersion comprising the undissolved material through one or more sieves of successively decreasing sizes.

14. The method of claim 13, wherein the one or more sieves have a mesh size in a range from about 5 mm to about 0.01 mm.

15. The method of claim 14, further comprising drying a remainder of the undissolved material after passing the dispersion through a sieve having the smallest mesh size to obtain a graphite powder.

* * * * *